United States Patent Office 2,817,155
Patented Dec. 24, 1957

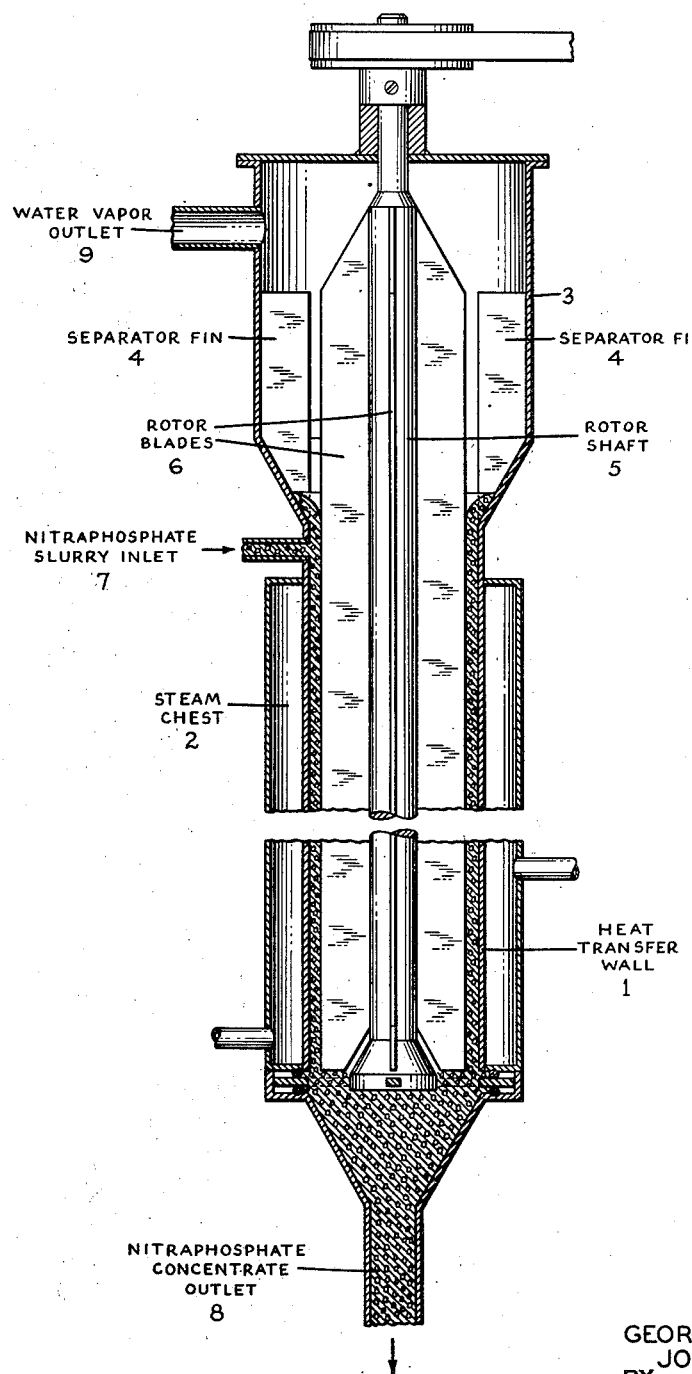

2,817,155

PROCESS FOR EVAPORATING NITRAPHOSPHATE SLURRIES

George R. Gilliam, Prince George, and Joseph A. Smith, Richmond, Va., assignors to Allied Chemical & Dye Corporation, New York, N. Y., a corporation of New York Application April 27, 1955, Serial No. 504,128

5 Claims. (Cl. 34—8)

This invention is directed to a process for evaporating ammoniated nitraphosphate slurries prepared by acidulating phosphate rock with nitric acid alone or together with sulfuric or phosphoric acids, followed by ammoniation of the acidulated material and, if desired, addition of other fertilizer ingredients such as potash salts, phosphate salts and nitrogen-containing salts.

Numerous processes have been described for the preparation of nitraphosphate fertilizers by acidulation of phosphate rock with aqueous acid solutions and ammoniation of the acidulated product to form an aqueous slurry. Additional materials are frequently incorporated with the acidulated material, especially potash salts to provide this fertilizer element and ammonium or phosphate salts to increase the nitrogen and $P_2O_5$ content of the product and to permit preparing products with differing ratios of the three primary plant food elements, phosphorus, nitrogen and potassium. In addition, compounds containing desirable trace elements, such as iron and magnesium, or fillers, may be added to the slurry. In general, nitraphosphates are prepared from phosphate rock, with or without triple superphosphate, by acidulation with nitric acid or with a mixture of acids consisting of nitric and sulfuric acids, nitric and phosphoric acids, or nitric, sulfuric, and phosphoric acids employing about seven to about twenty, preferably from about nine to sixteen, equivalents of mixed acid per mol of $P_2O_5$ in the rock. Nitric acid is considered to be a monobasic acid and phosphoric and sulfuric dibasic. Of the mixed acids from about 40 to 90 percent, preferably from about 60 to 85 percent of the equivalents of acid is nitric acid.

The nitraphosphate slurries thus produced, containing the supplemental additions when made, usually contain about 12%–30% water, practically all of which must be evaporated ot obtain suitably dry products for marketing. Two characteristics of these slurries have presented serious problems in developing suitable evaporating methods. First, prolonged heating of the slurries at high temperatures leads to decomposition and loss of valuable fertilizing material. Secondly, the presence of large amounts of highly water soluble salts, particularly the ammonium salts, causes the slurries to pass through a very viscous, sticky stage as their water content is reduced by evaporation. Direct-fired rotary drum driers have heretofore been employed using heating gases at very high temperatures to reduce the "fouling" of the interior of the drier surfaces by the concentrated materials being processed. It also has been usual to provide scrapers to remove material adhering to the drier walls. Another experient has been to employ such rotary drum driers for the partial evaporation of the slurries to a water content in the range 12%–18%, for example. The partially evaporated material is blended with recycled dried product in amount sufficient to reduce the water content of the mixture to, for example, 4%–6% water. The mixture with this lowered water content then may be further dried in a conventional rotary drier to about 2% water or less desired in the final fertilizer product.

In developing processes of the described types, it was found during evaporation of the nitraphosphate slurries in rotating drum driers there was a substantial loss of nitrogen which it appears cannot be reduced when operating on a commercial scale. With a chloride salt present the nitrogen losses became even greater so it is not practicable to employ this type of evaporation when the materials treated contain potassium chloride as a source of $K_2O$.

Design of rotary driers with capacities of the order of 15–30 tons per hour such as should be provided for economical commercial operation, appears to be difficult, if not impossible, for handling those compositions which contain or form solids during their concentration and require blades to scrape off solid adhering to the evaporator wall. Holding liquid concentrate in a rotary drier or disposing of such concentrate at times of mechanical failure of the drier or equipment associated therewith, presents a difficult problem.

The evaporation of water from the nitraphosphate slurries in rotary drum driers is unexpectedly sensitive to scaling up the sides of the driers. For example, slurries with added recycle, containing about 30% liquid phase, which had been successfully dried in rotary driers of the size used in small pilot plant work, having internal diameters up to 1 foot, fouled rotary driers having internal diameters of about 8 feet and larger, under the same or similar operation conditions. The size drier which could be used was particularly affected by composition of the solids content and amount of water in the slurry feed and temperature of the material passing through the drier.

The copending application of George R. Gilliam, Serial No. 504,355, filed April 27, 1955, discloses the evaporation of ammoniated nitraphosphate slurries may be successfully accomplished in film evaporators to reduce the water content of the slurries from 12% to 50% water to about 4% to 25% water when certain operating conditions are maintained in the film evaporator. We have further discovered a particular type of film evaporation operated under certain particular conditions is especially effective for handing these nitraphosphate slurries. Their use permits evaporating the desired quantity of water from these slurries in large-scale plant operation with high efficiency. Further, the losses of available plant food in the fertilizer product are kept very low by accomplishing the water evaporation with extremely short time of exposure of the slurries to the elevated temperatures in the evaporator.

We have discovered the ammoniated nitraphosphate slurries containing about 14% to about 30% water, as usually prepared, or those containing somewhat less or substantially more water, 12% to 50% water, can be efficiently evaporated to reduce the water content to within the range about 4% to about 15% water, preferably 6% to 10% water, by the process of our invention which is characterized by the following operating steps and conditions maintained in carrying out those steps.

The nitraphosphate slurry to be concentrated is passed as a film of the material flowing over the inner, cylindrical heat transfer surface of tubular heat transfer means to which heat is supplied from a heating medium at temperatures of 130° to 250° C., preferably at temperatures in the range 150° to 230° C. The free surface of the flowing film of slurry (the surface opposite that in contact with the heat transfer walls) is subjected to an agitating action by solid surfaces presenting a forward face adjacent the slurry film which is substantially perpendicular to the film surface and moves along the film surface transversely of the direction of flow of the film at a rate of 10 to 60 ft./sec., preferably 25 to 50 ft./sec. The slurry is fed to the heat transfer surface at a rate of about 600 lbs. to about 3000 lbs., preferably 900 lbs. to 2600 lbs., of slurry/hour/perimetric foot of heat transfer surface contacted by the slurry, and with less than 30 secs., preferably no more than about 10 secs., retention time in contact with that surface.

Of the above conditions characterizing the processes of our invention, the rate of feed and retention time define for all practical purposes the film thickness in the apparatus used for evaporating slurry. In operating our process under the above conditions, the thicknesses of the films flowing in contact with the heat transfer surfaces are no greater than about 0.25 inch. The clearance between the heat transfer walls and the solid surfaces agitating the free surface of the film influences the permissible rate of feed for a given apparatus used for evaporating ammoniated nitraphosphate slurries in accordance with our invention. Suitable clearances range from 0.010" to 0.50", preferably 0.030" to 0.30". The speeds at which the solid surfaces move along the film surface, the feed rates and retention times specified above characterize conditions of turbulence of the slurry which we have found effectively maintains it as a mobile fluid while flowing over the heat exchange surfaces and undergoing concentration. Quick removal of the concentrate from the evaporator which may, if necessary, be supplemented by induced agitation of the concentrate during its passage from the heat exchange surfaces to and through the evaporator outlet, prevents blocking by formation of solids.

An apparatus particularly effective for carrying out the processes of our invention is shown in cross-section in the accompanying drawing.

With reference to the drawing, the lower portion of a tubular element 1 serves at a heat transfer wall, surrounded by a steam chest or heating jacket. The upper portion is somewhat expanded in diameter to form a separator chamber 3 having stationary separator fins 4 spaced around its periphery. A rotor shaft 5 carrying rotor blades 6 extends axially of this tubular element. Between the expanded separator portion and the steam chest there is an inlet 7 for material to be concentrated to the space between the heat transfer wall and the rotating blades on the rotor shaft. A concentrate outlet 8 leads from the bottom of the tubular element. Water vapor vaporized from the material being concentrated rises in the space between the rotor blades to the separator chamber and thence to the vapor outlet 9 at the top of the separator chamber. A small clearance is provided between the rotor blades and the inner surface of the heat transfer wall. The blades 6 instead of being mounted axially may be given a slight spiral twist to provide positive impulsion of slurry downwardly through the evaporator.

The material fed to the apparatus, with liquid and solid separated in the separator chamber from the water vapor before it leaves the vapor outlet at the top of the separator chamber, flows as a film downwardly over the inner, heat transfer surfaces heated by steam introduced into the steam chest. The agitating action of the solid surfaces of the blades rapidly moving along the surface of the film of descending material being concentrated, transversely of the direction of flow of the film, induces great turbulence and mechanical agitation of the film of material. The centrifugal force imparted to any material separated from that surface acts to return that material to the film and thus maintain conditions of substantial continuity of the film descending over the heat transfer surface.

Our invention is further illustrated by the following examples employing the apparatus of the drawing for the evaporation of ammoniated nitraphosphate slurries.

*Example 1.*—A typical procedure for the production of an ammoniated nitraphosphate slurry is described in Example 2 of U. S. P. 2,680,680 to Gordon A. Coleman, which issued June 8, 1954. An ammoniated nitraphosphate slurry containing 18% water is prepared in accordance with that example by treating phosphate rock with nitric, phosphoric and sulfuric acids, ammoniating the acidulated product containing 32% water and adding potassium chloride to the ammoniated material. The following proportions of the several materials are employed in carrying out this process:

| | Pounds |
|---|---|
| Phosphate rock (34% $P_2O_5$) | 36 |
| Nitric acid (42% $HNO_3$) | 67.5 |
| Phosphoric acid (85% $H_3PO_4$) | 5.7 |
| Sulfuric acid (94.7% $H_2SO_4$) | 22 |
| Ammonia | 11.9 |
| Potassium chloride (62.5% $K_2O$) | 24.6 |

The evaporator used in this example for concentrating this nitraphosphate slurry containing 18% water has an interior diameter of 26 inches and a total heat transfer surface of 95 sq. ft. The rotor blades are rotated at a peripheral speed of about 2040 ft./min. and angular speed of 300 R. P. M., and the clearance between the blades and heated wall is 0.07".

The slurry is fed to the evaporator at a temperature of 120° C. and at the rate of 17,075 lbs./hr., corresponding to 2490 pounds slurry/hour/perimetric foot of heat transfer surface. Steam is supplied to the heating jacket at 185° C. The slurry is concentrated to 7% water in the nitraphosphate concentrate which leaves the outlet of the evaporator at 130° C. at the rate of 15,050 lbs./hr. The retention time for the slurry in contact with the heat transfer surface of the evaporator is about 7 secs. and the film thickness is about .06".

Further water removal is accomplished by first mixing the slurry concentrate at about the temperature at which it leaves the evaporator, with recycled dried product at a temperature of 50° C. in the ratio of 2.15 lbs. of recycled product to 1 lb. of slurry concentrate. This mixture, containing about 17.5% liquid phase, is passed through a direct-fired rotary drum drier having an internal diameter of 8.5 ft., in which its moisture content is reduced to about 1%. The heating gas passes through the drier concurrently to the drier feed mixture, so that at the inlet end of the drier gas temperatures of 375° C. are maintained at which the liquid phase present in the fertilizer mixture amounts to no more than 25%. This dried material preferably is screened to obtain product of the desired particle size. The off-size material and as much of the product-size material as may be necessary to provide the desired recycle ratio, is recycled as the dried product which is mixed with slurry concentrate from the film evaporator prior to further evaporation of moisture in the rotary drier. Before being mixed with the slurry, the larger size material to be recycled is ground or otherwise comminuted.

The process of this example may be modified to employ an evaporator having an interior diameter of 26 ins. and total heat transfer surface of 95 sq. ft., a clearance between the blades and heated wall of 0.30", with the rotor blades rotated at a peripheral speed of 2380 ft./min. and angular speed of 350 R. P. M. Steam is supplied to the heating jacket at 185° C. The slurry contains 18% water, and is fed to the evaporator at a rate of 15,700 lbs./hr., corresponding to about 2300 pounds slurry/hr./perimetric foot of heat transfer surface. It is concentrated to 6% water in the nitraphosphate concentrate leaving the evaporator at 130° C. at the rate of 13,696 lbs./hr. The retention time for the slurry in contact with the heat transfer surface is about 8 secs. and the film thickness is about 0.06". The slurry concentrate thus prepared is mixed with recycled dried product at 50° C. in a recycle ratio of 1.0 lb. dried product per pound of slurry concentrate. A mixture containing 25% liquid phase is thus obtained suitable for feeding to the rotary drier employing a lower recycle ratio than in the preceding operation. This modification employs a lower feed rate to the evaporator to reduce the water content of the slurry concentrate to 6% before it is mixed with the recycled dried product. A higher liquid phase in feed to the rotary drier is also utilized. The reduction in recycle ratio results in a 53% decrease in amount of dried recycle material which must be reprocessed in the rotary drum drier.

If, instead of evaporating water from the 18% ammoniated nitraphosphate slurry by the processes of this example, the slurry containing 18% water is mixed with sufficient dried product to produce a suitable feed for the rotary drum drier, a recycle ratio of about 4 to 7 lbs. dried product for every 1 lb. of slurry is required.

*Example 2.*—An ammoniated nitraphosphate slurry containing 14.9% water is prepared in accordance with the process of Example 1 of above U. S. P. 2,680,680, by treating phosphate rock and triple superphosphate with a mixture of nitric and sulfuric acids, and ammoniating the acidulated product with addition of supplemental water and potassium chloride. The following proportions of the several materials are employed in carrying out this process:

| | Pounds |
|---|---|
| Phosphate rock (34% $P_2O_5$) | 628 |
| Triple superphosphate (48% $P_2O_5$) | 62.8 |
| Nitric acid (50% $HNO_3$) | 1033 |
| Sulfuric acid (93.7% $H_2SO_4$) | 253 |
| Ammonia | 156.8 |
| Potassium chloride | 408 |
| Supplemental water added in the ammoniation step | 100 |

Slurry thus produced containing 20.1% water is fed to the evaporator at the rate of 1470 lbs./hr.

The evaporator employed in this example has an interior diameter of 6 ins. and total heat transfer surfaces of 8.45 sq. ft. The rotor blades are rotated at a peripheral speed of 2520 ft./min. and the clearance between the blades and heated wall is 0.12".

The slurry is fed to the evaporator at 82° C. and steam is supplied to the heating jacket at 182° C. The slurry is concentrated to 6.2% water in the nitraphosphate slurry concentrate which leaves the outlet of the evaporator at 138° C. at the rate of 1253 lbs./hr. The feed rate of slurry to the evaporator is 937 pounds/hour/perimetric foot of heat transfer surface. The retention time for the slurry in contact with the heat transfer surface is about 10 secs., and the film thickness is about 0.06".

Finely divided recycled product containing about 1% water and at 50° C., is mixed with the slurry concentrate at the temperature at which it leaves the evaporator in the ratio of 1.3 lbs. recycled product to 1 lb. slurry concentrate. This gives a mixture containing 22.0% liquid phase at the temperature of the mixture, suitable for drying in a direct-fired rotary drum drier, employing driers of large commercial plant size.

An important aspect of my invention is in the combination of the particular procedure of film evaporation of the nitraphosphate slurry to a point at which a relatively small proportion of recycled, dried material gives a suitable feed for large-size rotary drum driers in which the water content of the nitraphosphate concentrate is further reduced to no more than about 2%. In this combined two-step evaporation procedure, the water content of the initial slurry may be reduced to about 5% to about 15%, preferably to 5% to 10%. A small proportion of recycled, dried material then mixed with the nitraphosphate concentrate at the temperatures at which it leaves the evaporator, gives mixtures which contain a maximum of about 16% to about 28%, preferably 17% to 25%, liquid phase under the conditions maintained in the second drying step. Such mixtures are particularly adaptable to further drying in large-sized, rotary driers used in commercial plants.

We claim:

1. The process of evaporating water from an ammoniated nitraphosphate slurry containing 12% to 50% water which comprises passing said slurry as a film no greater than about 0.25" thick flowing over and in contact with the inner heat transfer surface of tubular heat transfer means to which heat is supplied from a heating medium at temperatures of 130° C. to 250° C., feeding the slurry to said heat transfer surfaces at the rate of about 600 lbs. to about 3000 lbs. of slurry/hour/perimetric foot of heat transfer surface, and subjecting the free surface of the flowing film to a turbulent action by solid surfaces presenting a forward face adjacent the slurry film which is substantially perpendicular to the film surface and moves along the film surface transversely of the direction of flow of the film at a rate of 10 ft./sec. to 60 ft./sec.

2. The process of evaporating water from an ammoniated nitraphosphate slurry containing 12% to 50% water which comprises passing said slurry as a film flowing over and in contact with the inner heat transfer surface of tubular heat transfer means to which heat is supplied from a heating medium at temperatures of 130° C. to 250° C., while subjecting the free surface of the flowing film to a turbulent action by solid surfaces presenting a forward face adjacent the slurry film which is substantially perpendicular to the film surface and moves along the film surface transversely of the direction of flow of the film and at a rate of 10 ft./sec. to 60 ft./sec., feeding the slurry to said heat transfer surfaces at the rate of about 600 lbs. to about 3000 lbs. of slurry/hour/perimetric foot of heat transfer surface, and maintaining a retention time of the slurry in contact with said surface of less than 30 secs., thereby maintaining the thickness of said film flowing over the heat transfer surface at a value no greater than 0.25".

3. The process of claim 2 in which the ammoniated nitraphosphate slurry to be concentrated contains about 14% to about 30% water and water is evaporated therefrom to produce a slurry concentrate containing about 4% to about 15% water, the heating medium supplying heat to said heat transfer means is at temperatures in the range 150° C. to 230° C., the rate of feeding said slurry to the heat transfer surfaces is within the range of about 900 lbs. to about 2600 lbs. of slurry/hour/perimetric foot of heat transfer surface and the retention time is no greater than about 10 secs., thereby maintaining the thickness of said film flowing over the heat transfer surface at a value which is substantially less than 0.25".

4. The process for producing a dry, solid fertilizer product from an ammoniated nitraphosphate slurry containing 12% to 50% water which comprises passing said slurry as a film flowing over and in contact with the inner surface of tubular heat transfer means to which heat is supplied from a heating medium at temperatures of 130° C. to 250° C., while subjecting the free surface of the flowing film to a turbulent action by solid surfaces presenting a forward face adjacent the slurry film which is substantially perpendicular to the film surface and moves along the film surface transversely of the direction of flow of the film and at a rate of 10 ft./sec. to 60 ft./sec., feeding the slurry to said heat transfer surfaces at the rate of about 600 lbs. to about 3000 lbs. of slurry/hour/perimetric foot of heat transfer surface and maintaining a retention time of the slurry in contact with said surface of less than 30 secs., thereby maintaining the thickness of said film flowing over the heat transfer surface at a value no greater than 0.25", and thereafter mixing the ammoniated nitraphosphate slurry concentrate thus produced with recycled, dry, solid product and drying the resulting mixture in a rotary drum drier to a water content of no more than 2%, said mixture containing a ratio of recycled product to slurry concentrate such that the maximum amount of liquid phase in the mixture undergoing the drying in said rotary drum drier is in the range 16% to 28%.

5. The process of claim 4 in which the ammoniated nitraphosphate slurry to be concentrated contains about 14% to about 30% water and water is evaporated therefrom to produce a slurry concentrate containing about 4% to about 15% water, the heating medium supplying heat to said heat transfer means is at temperatures in the range 150° C. to 230° C., the rate of feeding said slurry to the heat transfer surfaces is within the range of about 900 lbs. to about 2600 lbs. of slurry/hour/perimetric foot of heat transfer surface and the retention time is less than 10 secs., thereby maintaining the thickness of said film flowing over the heat transfer surface at a value which is substantially less than 0.25", and thereafter mixing the ammoniated nitraphosphate slurry concentrate thus produced with recycled, dry, solid product and drying the resulting mixture in a rotary drum drier to a water content of no more than 2%, said mixture containing a ratio of recycled product to slurry concentrate such that the maximum amount of liquid phase in the mixture undergoing the drying in said rotary drum drier is substantially 17% to 25%.

References Cited in the file of this patent

UNITED STATES PATENTS

| | | |
|---|---|---|
| 1,551,965 | Muller | Sept. 1, 1925 |
| 2,493,218 | Bergstrom | Jan. 3, 1950 |
| 2,521,442 | Birdseye | Sept. 5, 1950 |
| 2,717,458 | Shabaker | Sept. 13, 1955 |

U. S. DEPARTMENT OF COMMERCE
PATENT OFFICE

CERTIFICATE OF CORRECTION

Patent No. 2,817,155                          December 24, 1957

George R. Gilliam et al.

It is hereby certified that error appears in the printed specification of the above numbered patent requiring correction and that the said Letters Patent should read as corrected below.

Column 1, line 49, for "ot" read -- to --; column 2, line 21, for "sides" read -- size --; line 41, for "handing" read -- handling --; column 3, line 33, for "serves at" read -- serves as --; column 4, line 41, for "concurrently" read -- cocurrently --.

Signed and sealed this 18th day of March 1958.

(SEAL)
Attest:
KARL H. AXLINE
Attesting Officer

ROBERT C. WATSON
Commissioner of Patents